US012392394B2

(12) United States Patent
Averichev et al.

(10) Patent No.: US 12,392,394 B2
(45) Date of Patent: Aug. 19, 2025

(54) PLANETARY GEARBOX WITH THRUST WASHER FOR TWO RING GEARS, AXIAL RING GEAR SUPPORT, THRUST WASHER FOR A RING GEAR, AND ELECTRIC VEHICLE DRIVE TRAIN WITH AXIALLY SUPPORTED RING GEARS

(71) Applicant: Schaeffler Technologies AG & Co. KG, Herzogenaurach (DE)

(72) Inventors: Johann Averichev, Nuremberg (DE); Sarah Sponsel, Aurachtal (DE); Peter Welker, Herzogenaurach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 18/717,129

(22) PCT Filed: Nov. 10, 2022

(86) PCT No.: PCT/DE2022/100833
§ 371 (c)(1),
(2) Date: Jun. 6, 2024

(87) PCT Pub. No.: WO2023/104233
PCT Pub. Date: Jun. 15, 2023

(65) Prior Publication Data
US 2025/0035191 A1 Jan. 30, 2025

(30) Foreign Application Priority Data
Dec. 9, 2021 (DE) .......................... 102021132457.2

(51) Int. Cl.
*F16H 57/08* (2006.01)
*F16C 17/04* (2006.01)
(Continued)

(52) U.S. Cl.
CPC ............... *F16H 1/28* (2013.01); *F16C 17/04* (2013.01); *F16H 57/043* (2013.01);
(Continued)

(58) Field of Classification Search
CPC ...... F16H 1/28; F16H 57/043; F16H 57/0486; F16H 2057/085; F16C 17/04; F16C 2361/61
See application file for complete search history.

(56) References Cited

U.S. PATENT DOCUMENTS

2008/0113842 A1  5/2008  Kinoshita et al.

FOREIGN PATENT DOCUMENTS

DE     3507232 C2   11/1989
DE  102012213971 A1   5/2014
(Continued)

*Primary Examiner* — Tisha D Lewis
(74) *Attorney, Agent, or Firm* — Volpe Koenig

(57) ABSTRACT

A planetary gearbox having two ring gears arranged in different planes, of which a first ring gear and a second ring gear are designed to mesh during operation with at least one planet gear of a respective planet gear set, wherein a thrust washer is arranged axially between the two ring gears and a first contact area for making contact with the first ring gear is present on the first end face and a second contact area for making contact with the second ring gear is present on the second end face.

19 Claims, 2 Drawing Sheets

(51) Int. Cl.
*F16H 1/28* (2006.01)
*F16H 57/04* (2010.01)

(52) U.S. Cl.
CPC ...... *F16H 57/0486* (2013.01); *F16C 2361/61* (2013.01); *F16H 2057/085* (2013.01)

(56) References Cited

FOREIGN PATENT DOCUMENTS

| | | | | |
|---|---|---|---|---|
| DE | 102015205264 A1 | | 9/2016 | |
| DE | 102015206933 A1 | | 10/2016 | |
| DE | 102015210936 A1 | | 12/2016 | |
| DE | 102009027719 B4 | | 8/2018 | |
| JP | 2002161950 A | * | 6/2002 | ............... F16H 3/66 |
| JP | 2008115972 A | * | 5/2008 | ............ F16H 57/10 |
| JP | 2013072441 A | * | 4/2013 | ............ F16H 3/666 |
| JP | 2013092167 A | | 5/2013 | |
| KR | 1020070084659 A | * | 8/2007 | ............ F16H 57/02 |

* cited by examiner

PLANETARY GEARBOX WITH THRUST WASHER FOR TWO RING GEARS, AXIAL RING GEAR SUPPORT, THRUST WASHER FOR A RING GEAR, AND ELECTRIC VEHICLE DRIVE TRAIN WITH AXIALLY SUPPORTED RING GEARS

CROSS-REFERENCE TO RELATED APPLICATIONS

This application is the U.S. National Phase of PCT Appln. No. PCT/DE2022/100833, filed Nov. 10, 2022, which claims priority from German Patent Application No. 10 2021 132 457.2, filed Dec. 9, 2021, the entire disclosures of which are incorporated by reference herein.

TECHNICAL FIELD

The disclosure relates to a planetary gearbox comprising two ring gears which are arranged in different planes and of which a first ring gear and a second ring gear are designed to mesh with at least one planet gear of a (dedicated, in each case) planet gear set during operation.

BACKGROUND

Gearbox assemblies for vehicles are already known from the prior art, such as from DE 10 2015 210 936 A1. This older patent application discloses a gearbox assembly with a first planetary gear stage having a first ring gear in engagement with a first set of planet gears and a first planet gear carrier for supporting the first set against planet gears. Furthermore, there is a second planetary gear stage having a second ring gear in engagement with a second set of planet gears and a second planet gear carrier for supporting the second set against planet gears. To connect the first and second planetary gear stages, the first and second ring gears are firmly connected (to each other). What has been shown to be special in this older patent application is that the first and second ring gears have a common ring gear carrier for radial support, which is axially mounted on the first planet gear carrier on the one hand and on the second planet gear carrier on the other hand.

DE 102012213971 A1 discloses a planetary gearbox having a central sun gear, a ring gear that surrounds the sun gear, planet gears that are arranged radially between the sun gear and the ring gear and mesh in them, and a ring for absorbing axial forces, which couples at least one of the planet gears in the axial direction of the planetary gear to the sun gear and/or the ring gear. The ring is arranged in the axial direction of the planetary gearbox in the region of the tooth width of the planetary gear and engages in a form-fitting manner in at least one annular groove of the sun gear, the planet gear and/or the ring gear US 2008/0113842 A1 shows a torque distribution apparatus that has a differential gear unit, a planet gear set disposed between a first and a second output shaft, a motor that drives the planet gear set, and a speed change gear set that compensates for a speed change ratio of the planet gear set. The planetary gear set and the gear change gear set are arranged coaxially with respect to the first output shaft. The motor is arranged coaxially outside the planet gear set and the speed change gear set DE102015206933A1 describes a gear motor consisting of a direct current motor with a motor shaft, a planetary gearbox with a sun gear, multiple planet gears, a ring gear, a gearbox housing, a gearbox output shaft and a planet carrier, wherein the planet gears are engaged with tooth systems of the ring gear.

DE102015205264A1 discloses a drive unit for an industrial truck, comprising a first planetary stage and a second planetary stage, wherein the first planetary stage comprises first rotating gears and at least two first stationary gears and wherein the second planetary stage comprises second rotating gears and at least two second stationary gears. The drive unit is also characterized in that the first rotating gears are designed as first stepped planet gears, each having two different first helical tooth systems, wherein the first stepped planet gears mesh with one of the first stationary gears in each case by means of one of the two different first helical tooth systems and mesh helical tooth systems with a further of the first stationary gears in each case by means of a further of the two different first helical tooth systems, that the second gear stage has at least one second helical tooth system, that the first and the second gear stage are axially supported against one another and that the two different first helical tooth systems and the at least one second helical tooth system are designed in such a way that, during operation of the drive unit, axial forces generated by the two different first helical tooth systems and the at least one second helical tooth system compensate each other.

Furthermore, a clutch is known from DE102009027719A1, which comprises a sliding sleeve with a switching tooth system, at least one synchronizer ring with a locking tooth system, which can be rotated through a limited angle of rotation relative to the sliding sleeve, and at least one coupling body which interacts with the synchronizer ring and has a clutch tooth system Finally, DE3507232A1 discloses a wheel hub drive with a planetary gearbox, which has a movable bearing system of the pinion shaft, the planet gears, the planet carrier housing and the wheel hub and a fixed connection of the ring gear to the axle housing via the coupling gear. In order to achieve a short axial length of the connection between the clutch wheel and the axle housing and thus the entire wheel hub drive, the clutch wheel and the axle housing are designed at their mutually facing end faces with a form-fitting and frictionally interlocking edge tooth system and the clutch wheel is releasably attached in a flanged-mounted manner to the end face of the axle housing.

SUMMARY

The object of the disclosure is to avoid the disadvantages known from the prior art or at least mitigate them.

This is achieved according to the disclosure in that a thrust washer is arranged axially between the two ring gears and that a first contact area/axial contact area for making contact with the first ring gear is present/prepared on the first end face and a second contact area/axial contact area for making contact with the second ring gear is present/prepared on the second end face. Theoretically, it is conceivable to design the thrust washer/support plate in several parts, i.e. to provide the contact areas with separate rings. As a result, a main body of the thrust washer can be designed to be soft and/or imprecise and those components forming the contact area can be hardened and/or designed to be precise. These components can then be precisely adjusted to the interface parameters.

In particular, the disclosure also alleviates a previously unsolved technical problem in such a way that axial forces can now be made available to support a ring gear. In most cases, the ring gear does not rotate, which is why a bearing system may generally be unnecessary. However, there are also known driving modes in electric vehicles in which the ring gear rotates but does not experience any major loads. Even an ordinary bearing is unnecessary. The solution that is now being pursued is very unusual because it relies on a support that provides good deformation behavior in the gearbox system. This results in very good compactness and utilization of installation space.

In other words, the solution disclosed herein consists in using a very simple, inexpensive and relatively imprecise component to support the forces of the ring gear directly in the housing and to secure the position of the ring gear. For this purpose, the components and assembly processes already present in the gearbox are cleverly utilized. No additional components are necessary. In particular, the cost-effectiveness and effectiveness of the arrangement for absorbing axial forces is remarkable. The axial forces with relative movement in the circumferential direction (briefly) arise when the slide sleeve engages with the ring gear. The ring gear is moved into the area of axial contact and supported on the ring gear by a plate-like disk. A tooth system that is already provided for fixing the other ring gear is used as an anti-rotation device.

It has proven to be expedient that the thrust washer has a plate-like design and is provided with through-holes through which lubrication can be made possible.

Different operating states can also be covered by the disclosure. In this way, the "coupled" operating state can be realized. During traction operation, the two ring gears are pressed against each other and support each other via a support plate. Since the forces are different and the load on the load stage becomes higher, the resulting axial force is supported via the locking ring of the load stage ring gear/ second ring gear.

In overrun mode, the second ring gear now presses against the housing and the first ring gear/input ring gear/ring gear of the input stage presses against the sliding sleeve carrier. The thrust washer/support plate has no function in this case. In both cases, the two ring gears (first ring gear and second ring gear) are stationary, meaning that there is no relative speed between the components involved.

The "decoupled" case can also be realized. Since no torque is transmitted, only the drag torque on the output side acts on the gearbox. With the forces resulting from the drag torque, the first ring gear/input stage ring gear presses against the corresponding components. At the same time, owing to the decoupling function, there is also a relative speed because of the rotating ring gear.

The "coupling process" case can also be realized. In this case, the sliding sleeve presses against the first ring gear until the coupling process hopefully occurs. An axial force is exerted on the first ring gear, which is transmitted via the ring gear cover to the load stage ring gear/second ring gear and then into the housing. There is a constantly falling relative speed between the ring gear and the thrust washer/ support plate.

In general, it can be said that the effects occur when the tooth systems of both gear sets have different helix directions. The function is also available with identically helical tooth systems, but cannot be used quite as efficiently.

It can also be said that the idea consists in that the ring gear (first ring gear), which is stationary most of the time, is not axially supported against other gear set components by means of a bearing, as is usually the case, but rather this is achieved via a component that supports the forces directly in the housing. This can then also be used on the second ring gear/the ring gear of the load stage. If the forces of the first ring gear act in the direction of the second ring gear, they are introduced into the second ring gear via the connector part/support plate/thrust washer and then transferred into the (planetary) gearbox.

If the force of the second ring gear is opposite to that from the first ring gear of the input stage/first ring gear, these two forces compensate each other and the locking ring, which would normally have to support the forces of the ring gear of the load stage/the second ring gear, is relieved. There is a compensation or at least reduction of the forces.

The support disk/the support plate is held axially in both directions by the same locking ring that secures the load stage ring gear. A plug-in tooth system, which ensures the torque transmission between the housing and the load stage ring gear, is also used here as an anti-rotation device for the support plate, which is tangentially fixed there by means of a roughly punched spline on the outer diameter. Radially, the spline also restricts the freedom of movement of the support plate, but allows it to "float" and thus be adjusted.

The support disk/the support plate is nitrided so that it can support the frictional load from the differential speed and the effect of the actuating force during the coupling process of the ring gear of the input stage/the first ring gear. Nitriding thus counteracts wear. Either the entire thrust washer or just one or both contact areas of the thrust washer can be nitrided or otherwise hardened in different ways.

Advantageous embodiments are explained in more detail below.

According to the disclosure, the first contact area adjoins the radially inner edge of the thrust washer or extends to same from a central region of the thrust washer and/or the second contact area adjoins the radially outer edge/outer diameter of the thrust washer or extends to same from a central region of the thrust washer. In this way, wear-free contacting can be achieved on both sides using cost-effective and space-saving means.

It has proven useful if the first ring gear is in direct contact with the first contact area of the thrust washer in at least one operating state. The axial forces can then be transmitted directly and without torsion.

It is also advantageous if the thrust washer has an anti-rotation device on the outer edge which engages in a housing.

It is beneficial for production if the anti-rotation device is designed as a tooth system, such as a spline, for example as a serration spline.

In order to be able to realize switchability, it is advantageous if there is a sliding sleeve for axially displacing the first ring gear, for example in the direction of the second ring gear.

An advantageous embodiment is also characterized in that the first end face is designed as a contact surface for a locking ring near the radially outer edge. Precise positioning of the individual parts relative to each other can then be realized more easily.

It is also advantageous if the thrust washer is plate-like/ cup-like and/or has a through-hole or a plurality of through-holes distributed as evenly as possible around a center of rotation of the thrust washer to allow lubricant to pass through. The plate-like shape is conducive to non-cutting forming and manufacturing. The introduction of through-holes reduces wear during operation by providing a lubricant. It is advantageous if the through-holes are elongated, circular, oval, elliptical or polygonal. Alternating such different geometries is also conceivable.

It is also advantageous if the second ring gear is held in the housing in a rotationally fixed manner.

Furthermore, it is conceivable that the thrust washer is part of a planet carrier, for example the planet carrier by means of which the planet gears of a first planet gear set are mounted, the planet gears of which mesh with the first ring gear.

An advantageous embodiment is also characterized in that the two ring gears have internal tooth systems for interaction with the planet gears, which are specifically designed with respect to their helix selection such that the axial forces generated by the ring gears during operation are in opposite directions and preferably compensate for each other.

It is also useful if the gearbox is designed as a (two-stage) planetary gearbox.

It is conductive to particularly good adjustment if the first contact area and/or the second contact area is/are in each case less than half the size of the radial thickness, which is determined by the outer diameter minus the inner diameter of the ring gear provided for contacting, but larger than one tenth of the thickness.

BRIEF DESCRIPTION OF THE DRAWINGS

The disclosure is explained in more detail below with the aid of drawings.

In the drawings.

DETAILED DESCRIPTION

The figures are only schematic in nature and serve only for understanding of the disclosure. The same elements are provided with the same reference signs.

Figure 1:
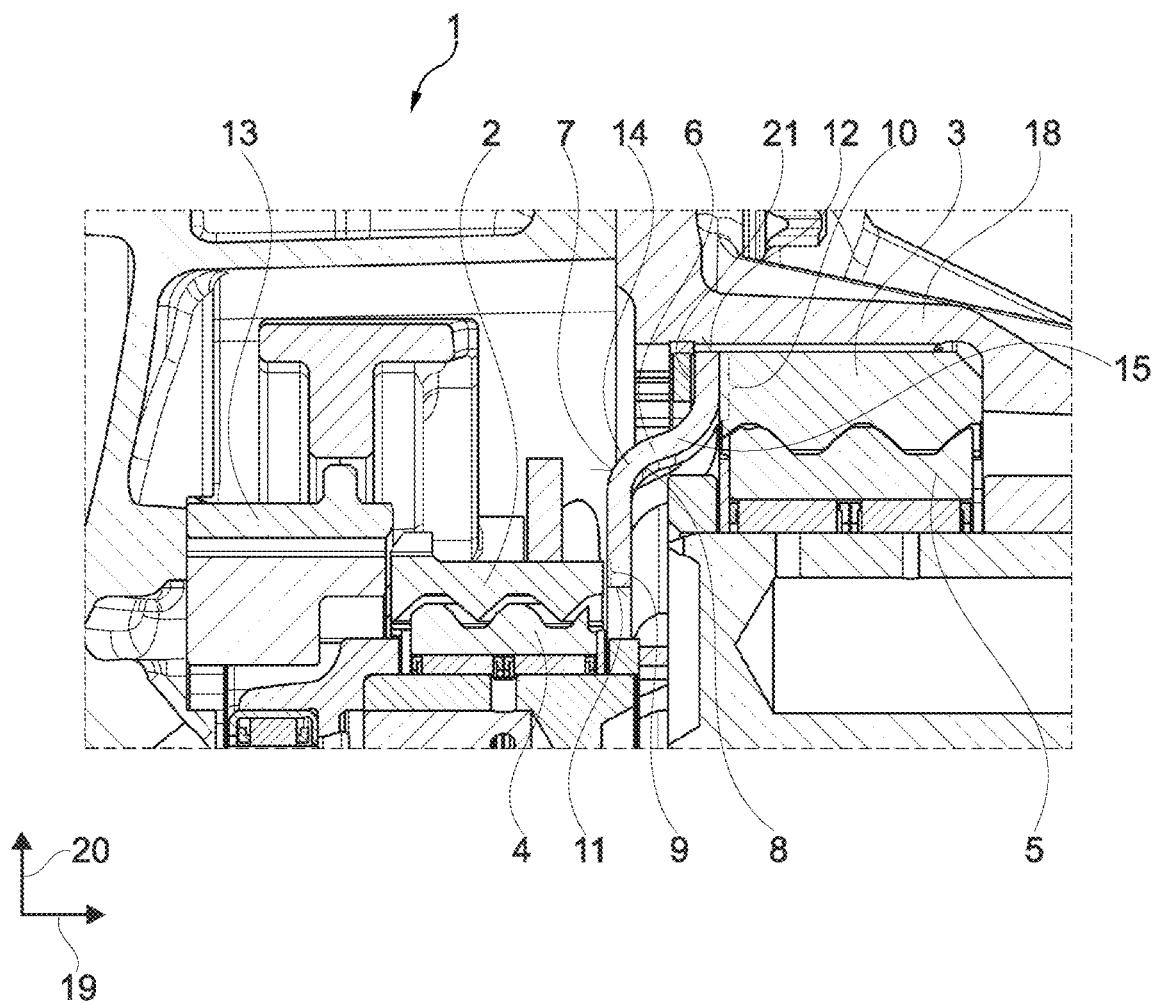
FIG. 1 shows a detail of a longitudinal section through a planetary gearbox according to the disclosure in the region of a thrust washer arranged between two ring gears, adjacent to a sliding sleeve.
Figure 3:
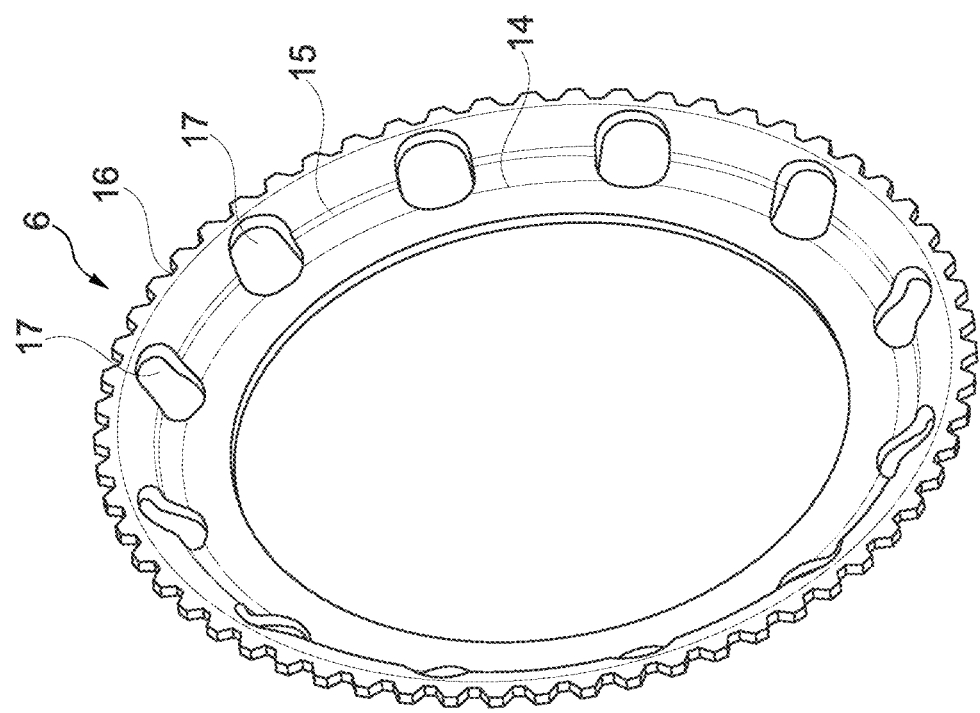
FIG. 3 shows a second perspective view of the thrust washer from FIG. 2.

FIG. 1 shows a first embodiment of a planetary gearbox 1 according to the disclosure. It has two ring gears, namely a first ring gear 2 and a second ring gear 3. The first ring gear 2 is an input ring gear, whereas the second ring gear 3 is an output ring gear, in particular a load ring gear. The first ring gear 2 is designed to mesh with a set of planet gears 4, whereas the second ring gear 3 is designed to mesh with a set of other planet gears 5.

There is a thrust washer 6, which can also be referred to as a thrust plate because it is realized as a sheet metal component formed without cutting. The thrust washer 6 has a first end face 7 and a second end face 8 facing away from it. On the first end face 7 there is a first contact area/first axial contact area 9. On the second end face 8 there is a second contact area/second axial contact area 10. In the region of the first contact area 9, a striking of the first ring gear 2 is desired, whereas in the second contact area 10, a striking of the second ring gear 3 is desired. The first contact area 9 is arranged in the region of a radially inner edge/inner diameter 11. The second contact area 10 is arranged in the region of a radially outer edge. The thrust washer 6 has an S-curve/double bend. There is a sliding sleeve 13.

The first contact area 9 extends from the radially inner edge 11 in the direction of a first bend 14. The second contact area 10 extends from the radially outer edge 12 in the direction of a second bend 15. A central region of the thrust washer 6 is defined between the two bends 14 and 15.

Figure 2:
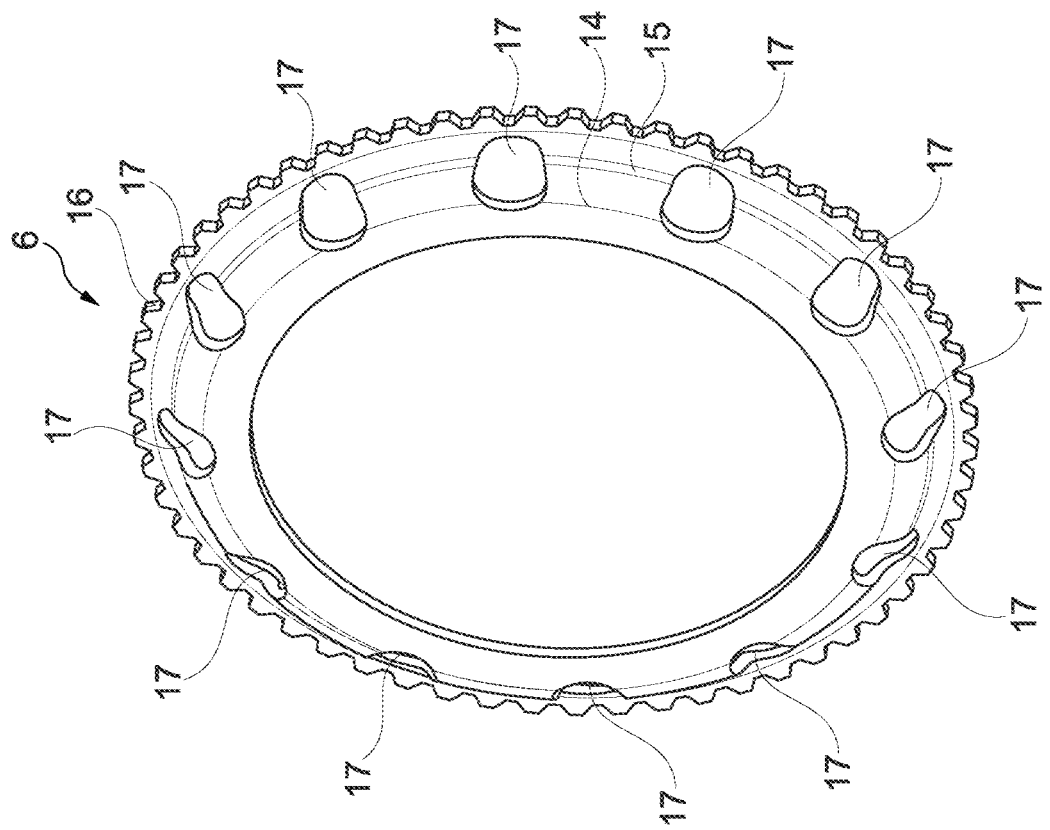
FIG. 2 shows a first perspective view of the thrust washer from FIG. 1.

With reference to FIG. 2, it is clear that the thrust washer 6 has an anti-rotation device 16 on its outer side. It is also clear that there are a large number of through-holes 17 evenly distributed over the circumference.

The anti-rotation device 17 is designed as a serration spline and the through-holes 17 are shaped as elongated holes and are disposed in the central region of the thrust washer 6, but in particular also in the region of the first bend 14 and the second bend 15.

Returning to FIG. 1, it should be added that the housing is referenced with the reference sign 18, the axial direction with the reference sign 19 and the radial direction with the reference sign 20. A locking ring 21 engages in a groove that is only indicated.

LIST OF REFERENCE SIGNS

1 Planetary gearbox
2 First ring gear
3 Second ring gear
4 Planetary gear
5 Planetary gear
6 Thrust washer/axial washer
7 First end face/first end face
8 Second end face/second end face
9 First contact area
10 Second contact area
11 Radially inner edge
12 Radially outer edge
13 Sliding sleeve
14 First bend
15 Second bend
16 Anti-rotation device
17 Through-hole
18 Housing
19 Axial direction
20 Radial direction
21 Locking ring

The invention claimed is:

1. A planetary gearbox, comprising:
first and second ring gears which are arranged in different planes;
a planet gear set, the first ring gear and the second ring gear are designed to mesh, during operation, with at least one planet gear of the planet gear set;
a thrust washer arranged axially between the first and second ring gears, a first contact area on a first end face of the thrust washer is configured for making contact with the first ring gear and a second contact area on a second end face of the thrust washer is configured for making contact with the second ring gear;
the first ring gear has a first outer diameter that is smaller than a second outer diameter of the second ring gear; and
the thrust washer has a first bend and a second bend, such that the first contact area adjoins a radially inner edge on a first axial side of the thrust washer and the second contact area adjoins a radially outer edge on a second axial side of the thrust washer.

2. The planetary gearbox according to claim 1, wherein the first ring gear, in an operating state, is in direct contact with the first contact area of the thrust washer.

3. The planetary gearbox according to claim 1, wherein the thrust washer has an anti-rotation device on the outer edge, and the anti-rotation device engages in a housing.

4. The planetary gearbox according to claim 3, wherein the anti-rotation device comprises a tooth system.

5. The planetary gearbox according to claim 1, further comprising a sliding sleeve adapted for axially displacing the first ring gear.

6. The planetary gearbox according to claim 1, wherein the first end face near the radial outer edge is designed as a contact surface for a locking ring.

7. The planetary gearbox according to claim 1, wherein the thrust washer is plate-shaped and has a through-hole to allow lubricant to pass through.

8. The planetary gearbox according to claim 3, wherein the second ring gear is held rotationally fixed in the housing.

9. The planetary gearbox according to claim 5, wherein the first and second ring gears have internal tooth systems for interaction with the planet gears, which are designed with respect to a helix selection thereof such that axial forces generated by the ring gears during operation are in opposite directions.

10. A planetary gearbox, comprising:
first and second ring gears which are arranged axially offset in different planes;
a planet gear set, the first ring gear and the second ring gear are designed to mesh, during operation, with at least one planet gear of the planet gear set;
a thrust washer arranged axially between the first and second ring gears, a first contact area on a first end face of the thrust washer is configured for making contact with the first ring gear and a second contact area on a second end face of the thrust washer, opposite to the first end face, is configured for making contact with the second ring gear;
the thrust washer has a first bend and a second, oppositely directed bend located between the first contact area and the second contact area, and the first contact area adjoins a radially inner edge of the thrust washer and the second contact area adjoins a radially outer edge of the thrust washer; and
a sliding sleeve adapted for axially displacing the first ring gear.

11. The planetary gearbox according to claim 10, wherein the first ring gear, in an operating state, is in direct contact with the first contact area of the thrust washer.

12. A planetary gearbox, comprising:
first and second ring gears which are arranged axially offset in different planes;
a planet gear set, the first ring gear and the second ring gear are designed to mesh, during operation, with at least one planet gear of the planet gear set;
a thrust washer arranged axially between the first and second ring gears, a first contact area on a first end face of the thrust washer is configured for making contact with the first ring gear and a second contact area on a second end face of the thrust washer, opposite to the first end face, is configured for making contact with the second ring gear;
the thrust washer has a first bend and a second, oppositely directed bend located between the first contact area and the second contact area, and the first contact area adjoins a radially inner edge of the thrust washer and the second contact area adjoins a radially outer edge of the thrust washer; and
wherein the thrust washer has an anti-rotation device on the outer edge, and the anti-rotation device engages in a housing.

13. The planetary gearbox according to claim 12, wherein the second ring gear is held rotationally fixed in the housing.

14. The planetary gearbox according to claim 12, wherein the anti-rotation device comprises a tooth system.

15. The planetary gearbox according to claim 12, further comprising a sliding sleeve adapted for axially displacing the first ring gear.

16. The planetary gearbox according to claim 10, wherein the first and second ring gears have internal tooth systems for interaction with the planet gears, which are designed with respect to a helix selection thereof such that axial forces generated by the ring gears during operation are in opposite directions.

17. The planetary gearbox according to claim 10, wherein the first end face near the radial outer edge is designed as a contact surface for a locking ring.

18. The planetary gearbox according to claim 10, wherein the thrust washer is plate-shaped.

19. The planetary gearbox according to claim 10, wherein the thrust washer has a through-hole to allow lubricant to pass through.

* * * * *